United States Patent
Jung et al.

(10) Patent No.: US 10,142,885 B2
(45) Date of Patent: Nov. 27, 2018

(54) METHOD FOR OPERATING TERMINAL IN WIRELESS COMMUNICATION SYSTEM AND TERMINAL USING SAME

(71) Applicant: LG ELECTRONICS, INC., Seoul (KR)

(72) Inventors: Sunghoon Jung, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 114 days.

(21) Appl. No.: 15/114,291

(22) PCT Filed: Feb. 9, 2015

(86) PCT No.: PCT/KR2015/001294
§ 371 (c)(1),
(2) Date: Jul. 26, 2016

(87) PCT Pub. No.: WO2015/119473
PCT Pub. Date: Aug. 13, 2015

(65) Prior Publication Data
US 2017/0013510 A1    Jan. 12, 2017

Related U.S. Application Data

(60) Provisional application No. 61/937,584, filed on Feb. 9, 2014.

(51) Int. Cl.
*H04W 28/02* (2009.01)
*H04W 28/08* (2009.01)
*H04W 76/27* (2018.01)
*H04W 48/10* (2009.01)
*H04W 8/00* (2009.01)

(52) U.S. Cl.
CPC ....... *H04W 28/08* (2013.01); *H04W 28/0247* (2013.01); *H04W 28/0284* (2013.01); *H04W 48/10* (2013.01); *H04W 76/27* (2018.02); *H04W 8/00* (2013.01)

(58) Field of Classification Search
None
See application file for complete search history.

(56) References Cited

U.S. PATENT DOCUMENTS

2010/0067375 A1    3/2010  Ianev
2011/0128911 A1*   6/2011  Shaheen ............... H04L 63/104
                                                          370/328

(Continued)

FOREIGN PATENT DOCUMENTS

KR    10-2012-0050805 A    5/2012
KR    10-2014-0007935 A    1/2014

(Continued)

*Primary Examiner* — Chi H Pham
*Assistant Examiner* — Shick Hom
(74) *Attorney, Agent, or Firm* — Dentons US LLP

(57) ABSTRACT

A method for operating a terminal in a wireless communication system and a terminal using the method are provided. The method is characterized by: receiving RAN auxiliary information related to steering traffic between a first network and a second network; receiving target information used for determining a target to which the RAN auxiliary information can be applied; and determining whether to apply the RAN auxiliary information based on the target information.

9 Claims, 16 Drawing Sheets

(56) References Cited

U.S. PATENT DOCUMENTS

2015/0289200 A1\* 10/2015 Nylander .............. H04W 48/06
370/331
2016/0353324 A1\* 12/2016 Lee ....................... H04W 28/08

FOREIGN PATENT DOCUMENTS

| KR | 10-2014-0012089 A | 1/2014 |
|----|-------------------|--------|
| WO | 2012/109272 A1 | 8/2012 |
| WO | 2012/130051 A1 | 10/2012 |

\* cited by examiner

METHOD FOR OPERATING TERMINAL IN WIRELESS COMMUNICATION SYSTEM AND TERMINAL USING SAME

This application is a National Stage Entry of International Application No. PCT/KR2015/001294 filed Feb. 9, 2015, which claims priority to U.S. Provisional Application No. 61/937,584 filed Feb. 9, 2014, both of which are incorporated by reference for all purposes as if fully set forth herein.

BACKGROUND OF THE INVENTION

Field of the Invention

The present invention relates to wireless communication, and more particularly, to a method of operating a User Equipment (UE) in a wireless communication system and the UE using the same.

Related Art

3rd Generation Partnership Project (3GPP) long term evolution (LTE), which is improved technology of Universal Mobile Telecommunications System (UMTS) has been introduced to 3GPP release 8. 3GPP LTE uses orthogonal frequency division multiple access (OFDMA) in a downlink and uses Single Carrier-frequency division multiple access (SC-FDMA) in an uplink. Nowadays, a discussion on 3GPP LTE-Advanced (LTE-A), which is improved technology of 3GPP LTE has been performed.

A wireless communication system may provide a service to a UE through a plurality of access networks. For example, the UE may receive a service from a 3GPP access network, which is a mobile wireless communication system and receive a service from a non-3GPP access network such as Worldwide Interoperability for Microwave Access (WiMAX) and a Wireless Local Area Network (WLAN).

While the UE establishes a connection with a 3GPP access network to receive a service, when a traffic overload occurs in the 3GPP access network, it may improve efficiency of an entire network that the UE processes traffic to process through another access network, i.e., a non-3GPP access network. In this way, traffic steering is referred to as steering of traffic or a path of traffic such that traffic may be variably processed through a 3GPP access network and/or a non-GPP access network.

For traffic steering, a policy for interworking of a 3GPP access network and a non-3GPP access network such as Access Network Discovery and Selection Functions (ANDSF) may be set to the UE, and the policy may be managed separately from an interworking policy set by the network.

Information related to traffic steering may be provided through system information. Because system information is generally broadcasted, a size thereof may be limited, and a very large size of system information may be a burden to a system. Information related to traffic steering may include, for example, an identity (ID) of a non-3GPP access network and a size of the ID may be maximum 32 octets.

When the UE reselects a cell, a procedure that updates system information together with information related to traffic steering may be required. Even when the UE reselects a frequency or changes an RRC state, the procedure may be required. In such a case, system information including information related to traffic steering should be able to again updated and thus system efficiency may be deteriorated.

SUMMARY OF THE INVENTION

The present invention provides a method of operating a UE in a wireless communication system and the UE using the same.

In one aspect, provided is a method for operating a User Equipment (UE) in a wireless communication system. The method includes receiving RAN assistance information about traffic steering between a first network and a second network, receiving target information used for determining a target that can apply the RAN assistance information and determining whether to apply the RAN assistance information based on the target information.

In another aspect, provided is a User Equipment (UE) operating in a wireless communication system. The UE includes a Radio Frequency (RF) unit that transmits and receives a wireless signal and a processor that couples and operates to the RF unit. The processor receives RAN assistance information about traffic steering between a first network and a second network, receives target information used for determining a target that can apply the RAN assistance information, and determines whether to apply the RAN assistance information based on the target information.

By a method of operating an UE according to an exemplary embodiment of the present invention, when information related to traffic steering is received, target information that can determine a target to which the information may be applied may be together provided. After the UE receives information related to traffic steering one time, even if a cell/frequency/RRC state is changed, it may be determined whether information related to the traffic steering may be equally applied based on the target information. If information related to the traffic steering may be equally applied, it is unnecessary to newly receive/set information related to traffic steering. Therefore, interworking between a 3GPP access network and a non-3GPP access network can be efficiently performed.

DESCRIPTION OF EXEMPLARY EMBODIMENTS

Figure 1:
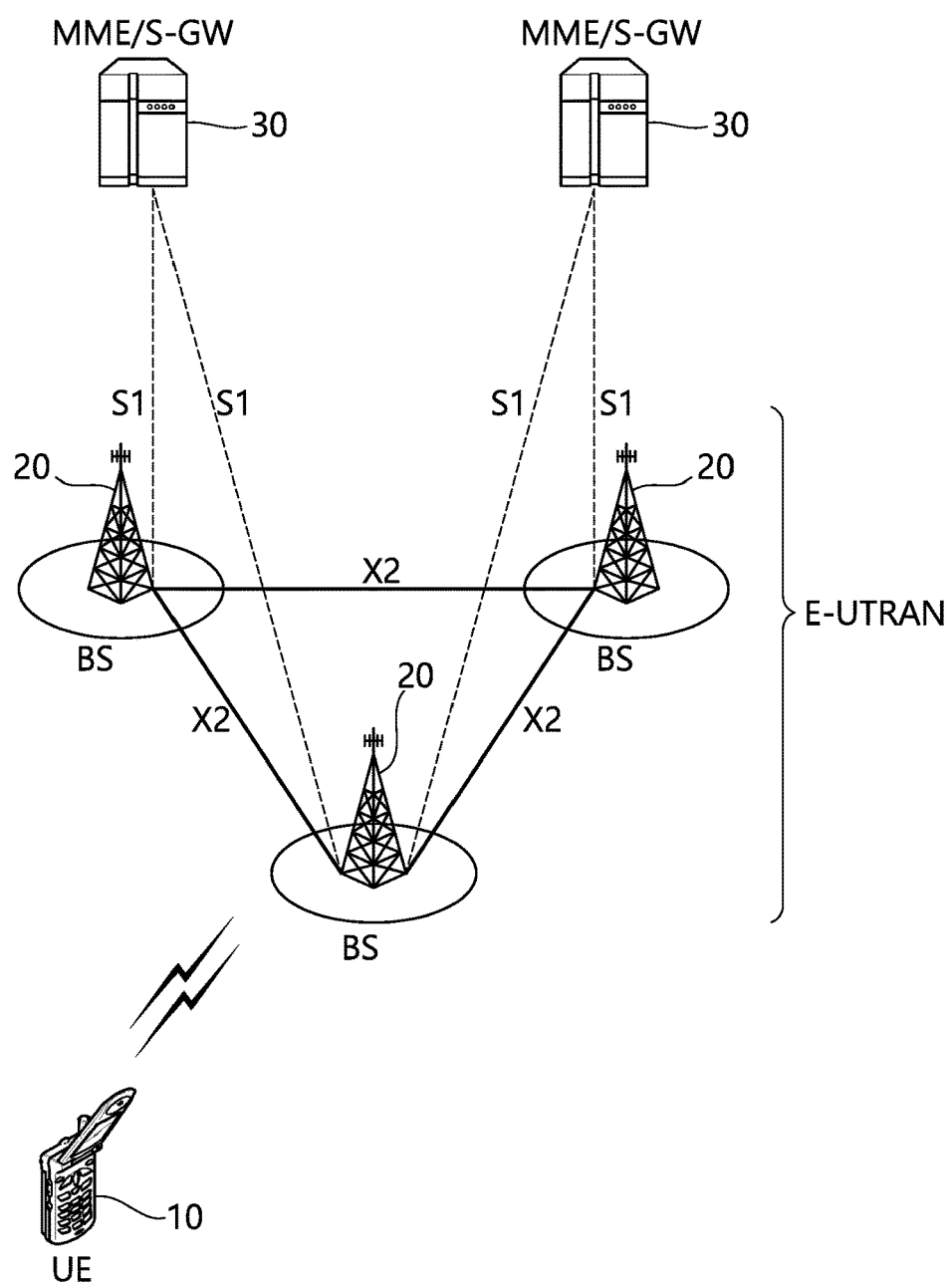
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
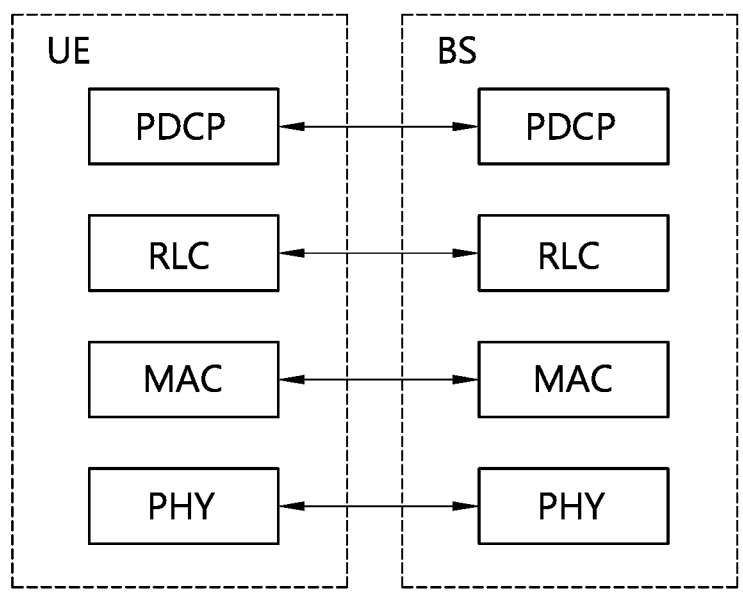
FIG. 2 is a diagram showing a wireless protocol architecture for a user plane.
Figure 3:
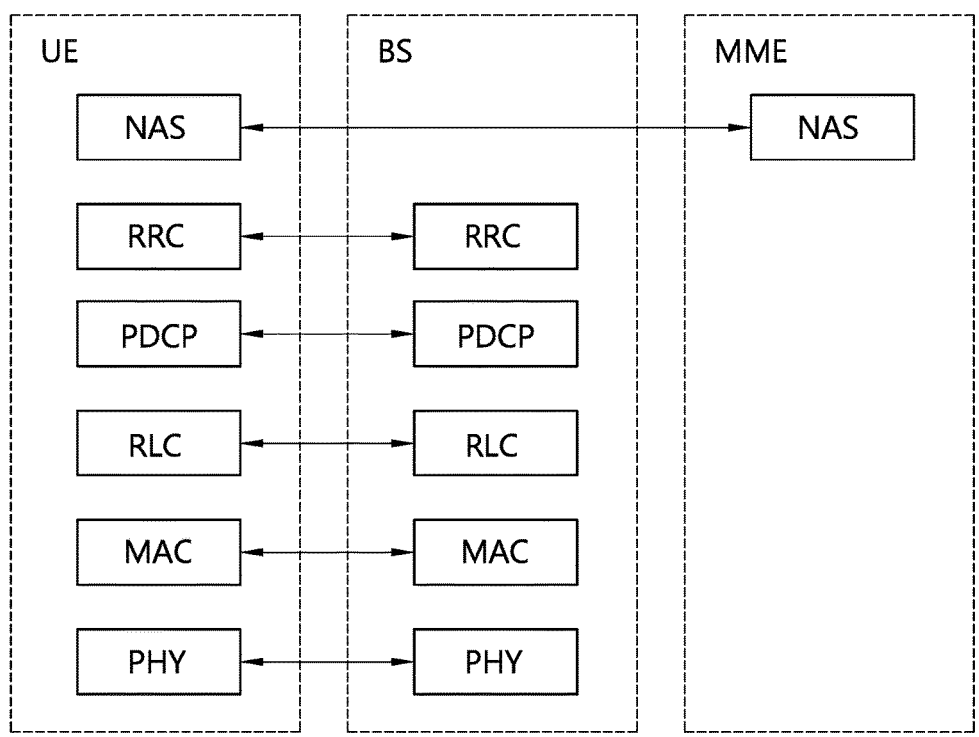
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

As disclosed in 3GPP TS 36.211 V8.7.0, in 3GPP LTE, a physical channel may be divided into a Physical Downlink Shared Channel (PDSCH) and a Physical Uplink Shared Channel (PUSCH), which are a data channel and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), which are a control channel.

The PCFICH transmitted from a first OFDM symbol of a subframe carries a control format indicator (CFI) of the number (i.e., a size of a control region) of OFDM symbols used for transmission of control channels within a subframe. The UE receives a CFI on the PCFICH and monitors the PDCCH.

The PDCCH is a downlink control channel and may be referred to as a scheduling channel because it carries scheduling information. Control information transmitted through the PDCCH is referred to as downlink control information (DCI). DCI may include resource allocation (may be referred to as downlink (DL) grant) of the PDSCH, resource allocation (may be referred to as uplink (UL) grant) of the PUSCH, and activation of a Voice over Internet Protocol (VoIP) and/or a set of transmission power control instructions of individual UEs within a random UE group.

3GPP LTE uses blind decoding for detection of the PDCCH. Blind decoding is a method of demasking a desired identifier to Cyclic Redundancy Check (CRC) of a received PDCCH (may be referred to as a candidate PDCCH) and checking a CRC error to determine whether a corresponding PDCCH is a control channel thereof.

The eNB determines a PDCCH format according to DCI to send to the UE, attaches CRC to the DCI, and masks an intrinsic identifier (referred to as a Radio Network Temporary Identifier (RNTI)) to the CRC according to an owner or use of the PDCCH.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include the limited number of parameters which are the most essential and are most frequently transmitted in order to obtain other information from a cell. UE first discovers an MIB after downlink synchronization. The MIB may include information, such as a downlink channel bandwidth, a PHICH configuration, an SFN supporting synchronization and operating as a timing reference, and an eNB transmission antenna configuration. The MIB may be broadcasted on a BCH.

SystemInformationBlockType1 (SIB1) of included SIBs is included in a "SystemInformationBlockType1" message and transmitted. Other SIBs other than the SIB1 are included in a system information message and transmitted. The mapping of the SIBs to the system information message may be flexibly configured by a scheduling information list parameter included in the SIB1. In this case, each SIB is included in a single system information message. Only SIBs having the same scheduling required value (e.g. period) may be mapped to the same system information message. Furthermore, SystemInformationBlockType2 (SIB2) is always mapped to a system information message corresponding to the first entry within the system information message list of a scheduling information list. A plurality of system information messages may be transmitted within the same period. The SIB1 and all of the system information messages are transmitted on a DL-SCH.

In addition to broadcast transmission, in the E-UTRAN, the SIB1 may be channel-dedicated signaling including a parameter set to have the same value as an existing set value. In this case, the SIB1 may be included in an RRC connection re-establishment message and transmitted.

The SIB1 includes information related to UE cell access and defines the scheduling of other SIBs. The SIB1 may include information related to the PLMN identifiers, Tracking Area Code (TAC), and cell ID of a network, a cell barring state indicative of whether a cell is a cell on which UE can camp, a required minimum reception level within a cell which is used as a cell reselection reference, and the transmission time and period of other SIBs.

The SIB2 may include radio resource configuration information common to all types of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and for detecting a change of system information to only a PCell. In an SCell, when the corresponding SCell is added, the E-UTRAN may provide all types of system information related to an RRC connection state operation through dedicated signaling. When system information related to a configured SCell is changed, the E-UTRAN may release a considered SCell and add the considered SCell later. This may be performed along with a single RRC connection re-establishment message. The E-UTRAN may set a value broadcast within a considered SCell and other parameter value through dedicated signaling.

UE needs to guarantee the validity of a specific type of system information. Such system information is called required system information. The required system information may be defined as follows.

If UE is in the RRC_IDLE state: the UE needs to have the valid version of the MIB and the SIB1 in addition to the SIB2 to SIB8. This may comply with the support of a considered RAT.

If UE is in the RRC connection state: the UE needs to have the valid version of the MIB, SIB1, and SIB2.

In general, the validity of system information may be guaranteed up to a maximum of 3 hours after being obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
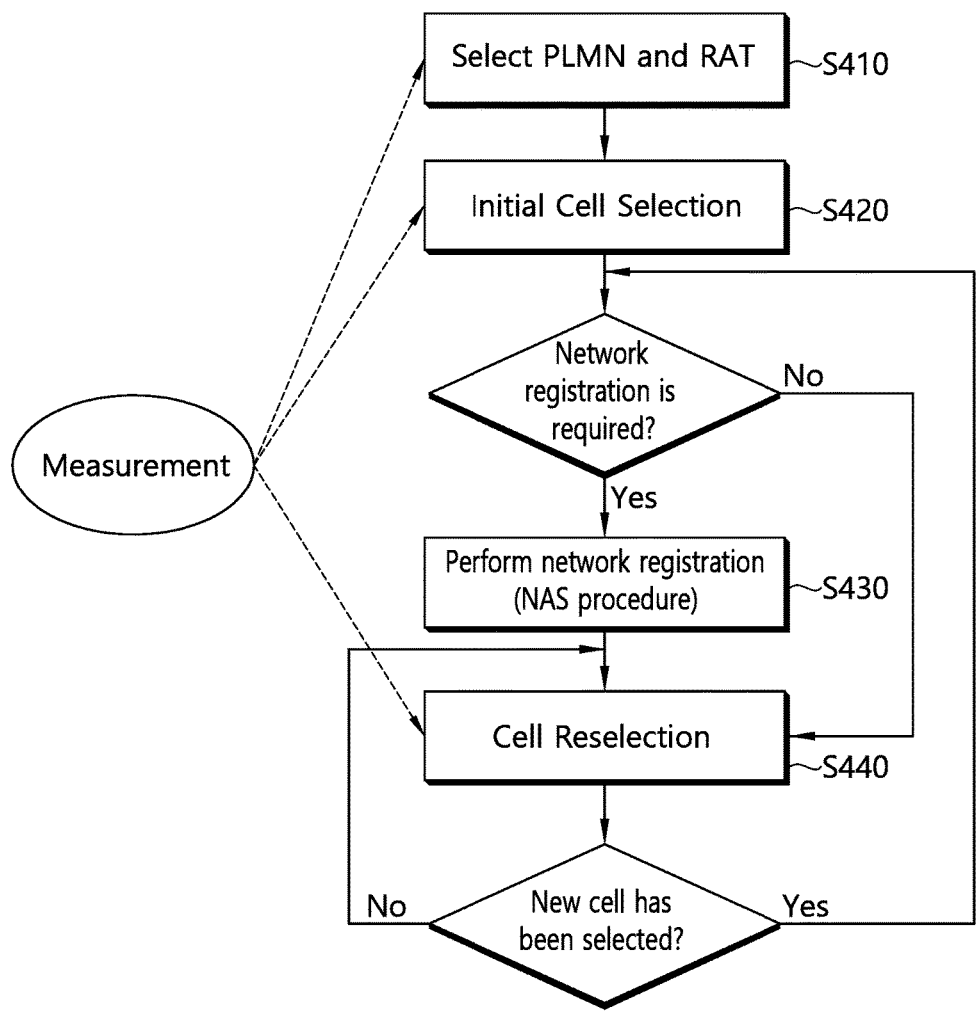
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
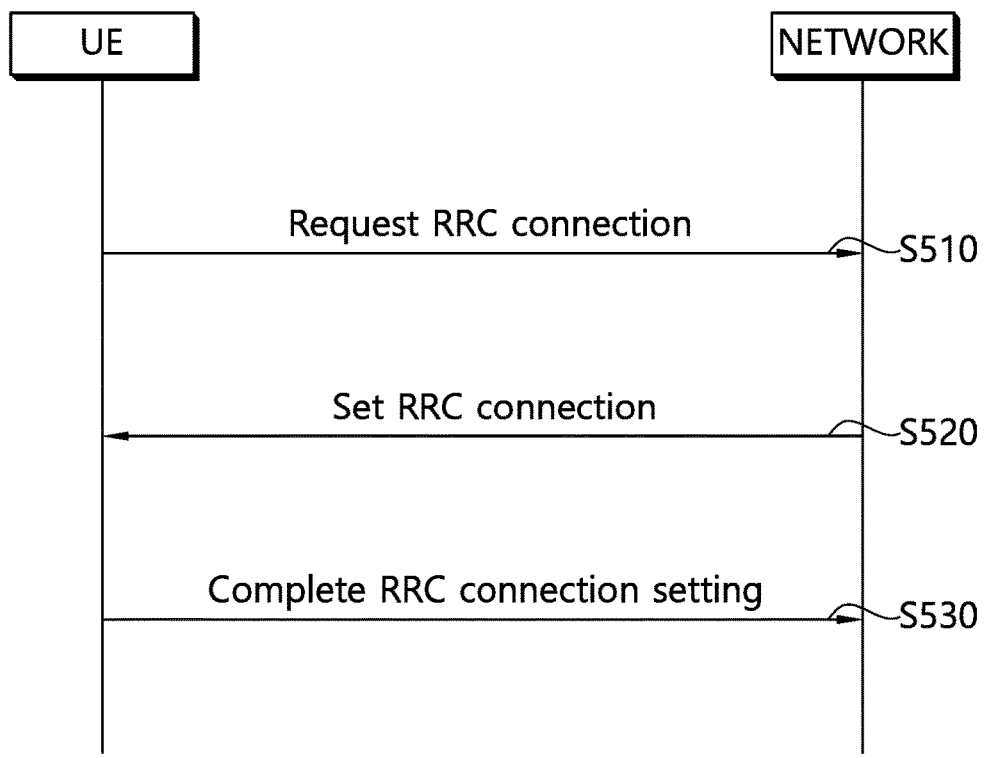
FIG. 5 is a flowchart illustrating a process of establishing RRC connection.

FIG. 5 is a flowchart illustrating a process of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
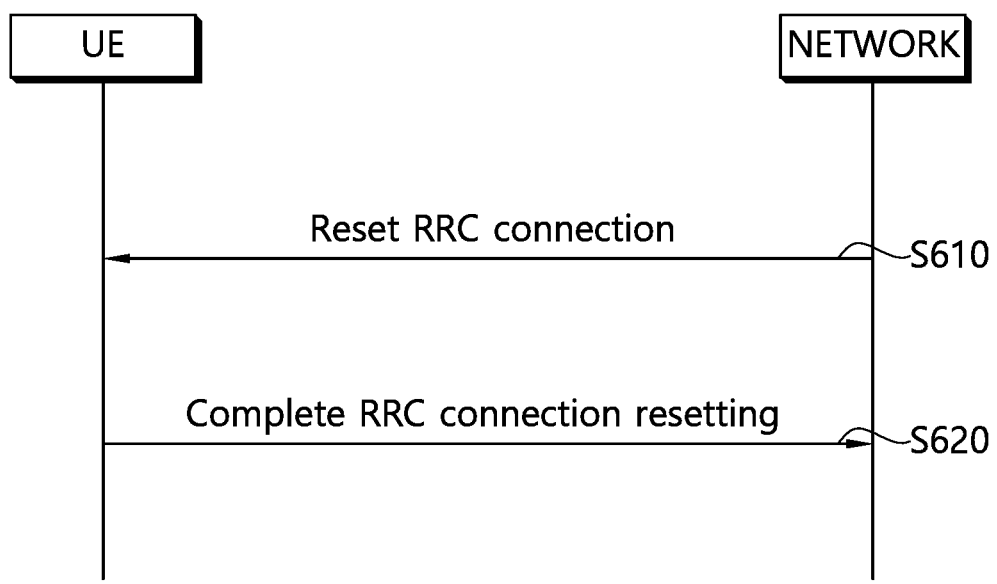
FIG. 6 is a flowchart illustrating an RRC connection reconfiguration process.

FIG. 6 is a flowchart illustrating an RRC connection reconfiguration process. An RRC connection reconfiguration is used to modify RRC connection. This is used to establish/modify/release RB s, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009 March) "User Equipment (UE) procedures in idle mode (Release 8)".

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

The cell selection criterion may be defined as below equation 1.

$Srxlev>0$ AND $Squal>0$ where:

$Srxlev = Q_{rxlevmeas} - (Q_{rxlevmin} + Q_{rxlevminoffset}) - P_{compensation}$ $Squal = Q_{qualmeas} - (Q_{qualmin} + Q_{qualminoffset})$ [Equation 1]

Here, the variables in the equation 1 may be defined as below table 1.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | $max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Signalled values, i.e., $Q_{rxlevmmoffset}$ and $Q_{qualmmoffset}$, may be applied to a case where cell selection is evaluated as a result of periodic search for a higher priority PLMN during a UE camps on a normal cell in a VPLMN. During the periodic search for the higher priority PLMN as described above, the UE may perform the cell selection evaluation by using parameter values stored in other cells of the higher priority PLMN.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 2.

$$Rs = Qmeas,s + Qhyst, Rn = Qmeas,s - Qoffset \quad \text{[Equation 2]}$$

In this case, Rs is the ranking criterion of a serving cell, Rn is the ranking criterion of a neighbor cell, Qmeas,s is the quality value of the serving cell measured by UE, Qmeas,n is the quality value of the neighbor cell measured by UE, Qhyst is the hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the highest-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

When the UE performs cell reselection according to cell reselection evaluation, if a cell reselection reference is satisfied for a specific time, the UE may determine that the cell reselection reference is satisfied and move a cell to the selected target cell. Here, a specific time is a $T_{reselection}$ parameter and may be given from the network. $T_{reselection}$ specifies a cell reselection timer value and may be defined for each frequency of an E-UTRAN and other RAT.

Hereinafter, cell reselection information used for cell reselection of the UE will be described.

Cell reselection information may be included and transmitted in system information broadcasted from a network with a format of a cell reselection parameter and may be provided to the UE. A cell reselection parameter provided to the UE may include the following kinds.

Cell reselection priority (cellReselectionPriority): The cellReselectionPriority parameter specifies a priority of a frequency of an E-UTRAN, a frequency of an UTRAN, a group of GERAN frequencies, and a band class of CDMA2000 HRPD or a band class of CDMA2000 1×RTT.

$Qoffset_{s,n}$: specifies an offset value between two cells.

$Qoffset_{frequency}$: specifies frequency specific offset of an E-UTRAN frequency of the same priority.

$Q_{hyst}$: specifies a hysteresis value of a rank index.

$Q_{qualmin}$: specifies a minimum required quality level and is specified in a dB unit.

$Q_{rxlevmin}$: specifies a minimum required Rx level and is specified in a dB unit.

$Treselection_{EUTRA}$: specifies a cell reselection timer value for an E-UTRAN and may be set for each frequency of the E-UTRAN.

$Treselection_{UTRAN}$: specifies a cell reselection timer value for an UTRAN.

$Treselection_{GERA}$: specifies a cell reselection timer value for a GERAN.

$Treselection_{CDMA\_HRPD}$: specifies a cell reselection timer value for CDMA HRPD.

$Treselection_{CDMA\_1xRTT}$: specifies a cell reselection timer value for CDMA 1×RTT.

$Thresh_{x, HighP}$: specifies a Srxlev threshold used by the UE in a dB unit when cell reselection to RAT/frequency of a priority higher than that of a serving frequency is performed. A specific threshold may be individually set for each frequency of the E-UTRAN and the UTRAN, each group of the GERAN frequency, each band class of CDMA2000 HRPD, and each band class of CDMA2000 1×RTT.

$Thresh_{x, HighQ}$: specifies a Squal threshold used by the UE in a dB unit when cell reselection to RAT/frequency of a priority higher than that of a serving frequency is performed. A specific threshold may be individually set for each frequency of the E-UTRAN and the UTRAN FDD.

$Thresh_{x, LowP}$: specifies a Srxlev threshold used by the UE in a dB unit when cell reselection to RAT/frequency of a priority lower than that of a serving frequency is performed. A specific threshold may be individually set for each frequency of the E-UTRAN and the UTRAN, each group of a GERAN frequency, and each band class of CDMA2000 HRPD, and each band class of CDMA2000 1×RTT.

$Thresh_{x, LowQ}$: specifies a Squal threshold used by the UE in a dB unit when cell reselection to RAT/frequency of a priority lower than that of a serving frequency is performed. A specific threshold may be individually set for each frequency of the E-UTRAN and the UTRAN FDD.

$Thresh_{Serving, LowP}$: specifies a Srxlev threshold used by the UE on a serving cell in a dB unit when cell reselection to low RAT/frequency is performed.

$Thresh_{Serving, LowQ}$: specifies a Squal threshold used by the UE on a serving cell in a dB unit when cell reselection to low RAT/frequency is performed.

$S_{IntraSerachP}$: specifies a Srxlev threshold of intra-frequency measurement in a dB unit.

$S_{IntraSerachQ}$: specifies a Squal threshold of intra-frequency measurement in a dB unit.

$S_{nonIntraSerachP}$: specifies a Srxlev threshold of an E-UTRAN inter-frequency and inter-RAT measurement in a dB unit.

$S_{nonIntraSerachQ}$: specifies a Squal threshold of an E-UTRAN inter-frequency and inter-RAT measurement in a dB unit.

Cell reselection information may be included in an RRC connection release message, which is an RRC message transmitted to release an RRC connection between the network and the UE and may be provided to the UE. For example, the RRC connection release message may include a cell reselection priority and a sub-carrier wave frequency list of an E-UTRAN, a cell reselection priority and a sub-carrier wave frequency list of UTRA-FDD, a cell reselection priority and a sub-carrier wave frequency list of UTRA-TDD, a cell reselection priority and a sub-carrier wave frequency list of a GERAN, a cell reselection priority and a band class list of CDMA2000 HRPD, and a cell reselection priority and a band class list of CDMA2000 1×RTT.

Hereinafter, Radio Link Monitoring (RLM) will be described.

In order to detect a downlink wireless link quality of a PCell, the UE monitors a downlink quality based on a cell-specific reference signal. In order to monitor a downlink wireless link quality of the PCell, the UE estimates a downlink wireless link quality and compares the downlink wireless link quality with thresholds Qout and Qin. The threshold Qout is defined to a level in which a downlink wireless link may not be stably received and corresponds to 10% block error rate of hypothetical PDCCH transmission in consideration of a PDFICH error. The threshold Qin is defined to a downlink wireless link quality level that may be received more stably than a level of Qout and corresponds to 2% block error rate of hypothetical PDCCH transmission in consideration of a PCFICH error.

A Radio Link Failure (RLF) is described below.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
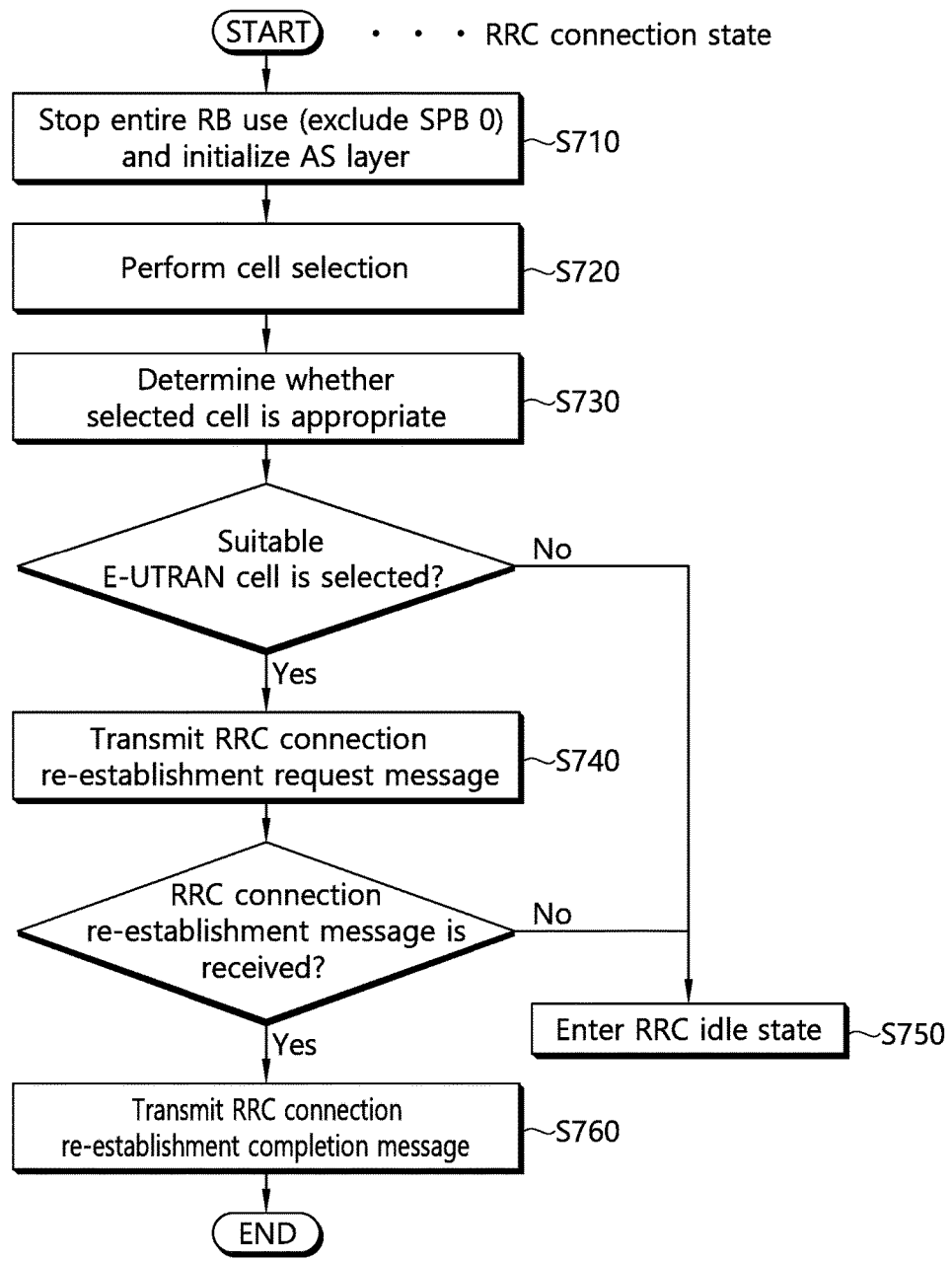
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this process, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
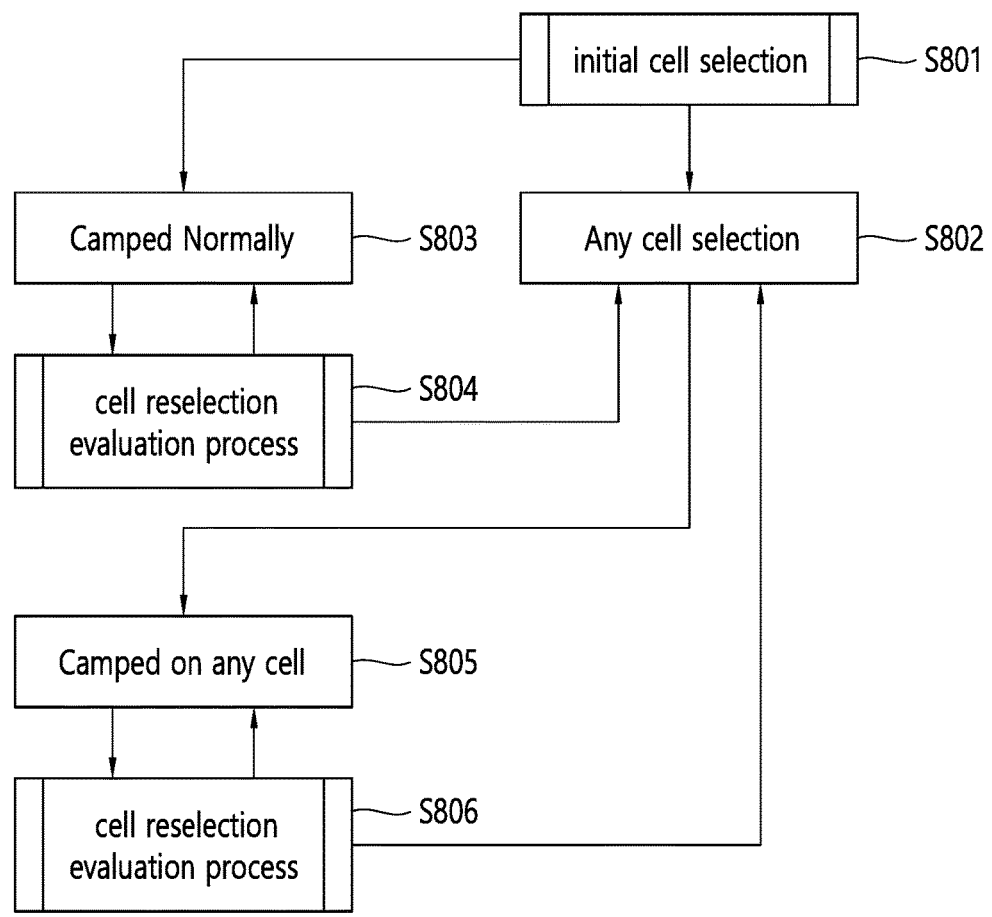
FIG. 8 illustrates substates which may be owned by UE in the RRC_IDLE state and a substate transition process.

FIG. 8 illustrates substates which may be owned by UE in the RRC_IDLE state and a substate transition process.

Referring to FIG. 8, UE performs an initial cell selection process (S801). The initial cell selection process may be performed when there is no cell information stored with respect to a PLMN or if a suitable cell is not discovered.

If a suitable cell is unable to be discovered in the initial cell selection process, the UE transits to any cell selection state (S802). The any cell selection state is the state in which the UE has not camped on a suitable cell and an acceptable cell and is the state in which the UE attempts to discover an acceptable cell of a specific PLMN on which the UE may camp. If the UE has not discovered any cell on which it may camp, the UE continues to stay in the any cell selection state until it discovers an acceptable cell.

If a suitable cell is discovered in the initial cell selection process, the UE transits to a normal camp state (S803). The normal camp state refers to the state in which the UE has camped on the suitable cell. In this state, the UE may select and monitor a paging channel based on information provided through system information and may perform an evaluation process for cell reselection.

If a cell reselection evaluation process (S804) is caused in the normal camp state (S803), the UE performs a cell reselection evaluation process (S804). If a suitable cell is discovered in the cell reselection evaluation process (S804), the UE transits to the normal camp state (S803) again.

If an acceptable cell is discovered in the any cell selection state (S802), the UE transmits to any cell camp state (S805). The any cell camp state is the state in which the UE has camped on the acceptable cell.

In the any cell camp state (S805), the UE may select and monitor a paging channel based on information provided through system information and may perform the evaluation process (S806) for cell reselection. If an acceptable cell is not discovered in the evaluation process (S806) for cell reselection, the UE transits to the any cell selection state (S802).

Hereinafter, interworking between access networks different from a 3GPP access network will be described.

While interworking with a non-3GPP access network (e.g., WLAN) from Rel-8 is introduced, 3GPP finds an accessible access network and standardizes Access Network Discovery and Selection Functions (ANDSF) for selection. ANDSF transfer access network search information (e.g., WLAN, WiMAX location information, etc.) that can access at a location of a UE, Inter-System Mobility Policies (ISMP)

that may reflect a policy of a provider, and an Inter-System Routing Policy (ISRP), and the UE may determine specific traffic to transmit via which access network based on the information. The ISMP may include a network selection rule in which the UE selects one active access network connection (e.g., WLAN or 3GPP). The ISRP may include a network selection rule in which the UE selects at least one latent active access network connection (e.g., the entire of WLAN and 3GPP). The ISRP includes Multiple Access PDN Connectivity (MAPCON), IP Flow Mobility (IFOM), and non-seamless WLAN offloading. For dynamic provision between ANDSF and the UE, Open Mobile Alliance Device Management (OMA DM) is used.

MAPCON standardizes technology that may simultaneously set and maintain multiple PDN connectivity via a 3GPP access network and a non-3GPP access network and that may perform seamless traffic offloading of an entire active PDN connection unit. For this reason, the ANDSF server provides Access Point Name (APN) information to perform offloading, a routing rule of access networks, a Time of Day to which an offloading method is applied, and validity area information to perform offloading. Here, offloading may define movement of load/traffic from a first access network to a second access network.

IFOM supports seamless offloading and mobility of an IP flow unit of a subdivided unit and having more flexibility than MAPCON. A technical characteristic of IFOM is that the UE can access through different access networks, even if the UE is connected to a packet data network using the same access point name (APN) unlike MAPCON, and IFOM enables a unit of mobility and offloading to move in a specific service IP traffic flow unit instead of a packet data network (PDN) and thus has flexibility of service providing. For this reason, the ANDSF server provides IP flow information to perform offloading, a routing rule between access networks, a Time of Day to which an offloading method is applied, and validity area information to perform offloading.

Non-seamless WLAN offloading is technology that completely offloads traffic not to pass though EPC as well as change of a path of any specific IP traffic to a WLAN. Because anchoring is not performed at a P-GW for mobility support, offloaded IP traffic may not be again seamlessly moved to a 3GPP access network. For this reason, the ANDSF server provides information similar to information providing to perform IFOM to the UE.

Figure 9:
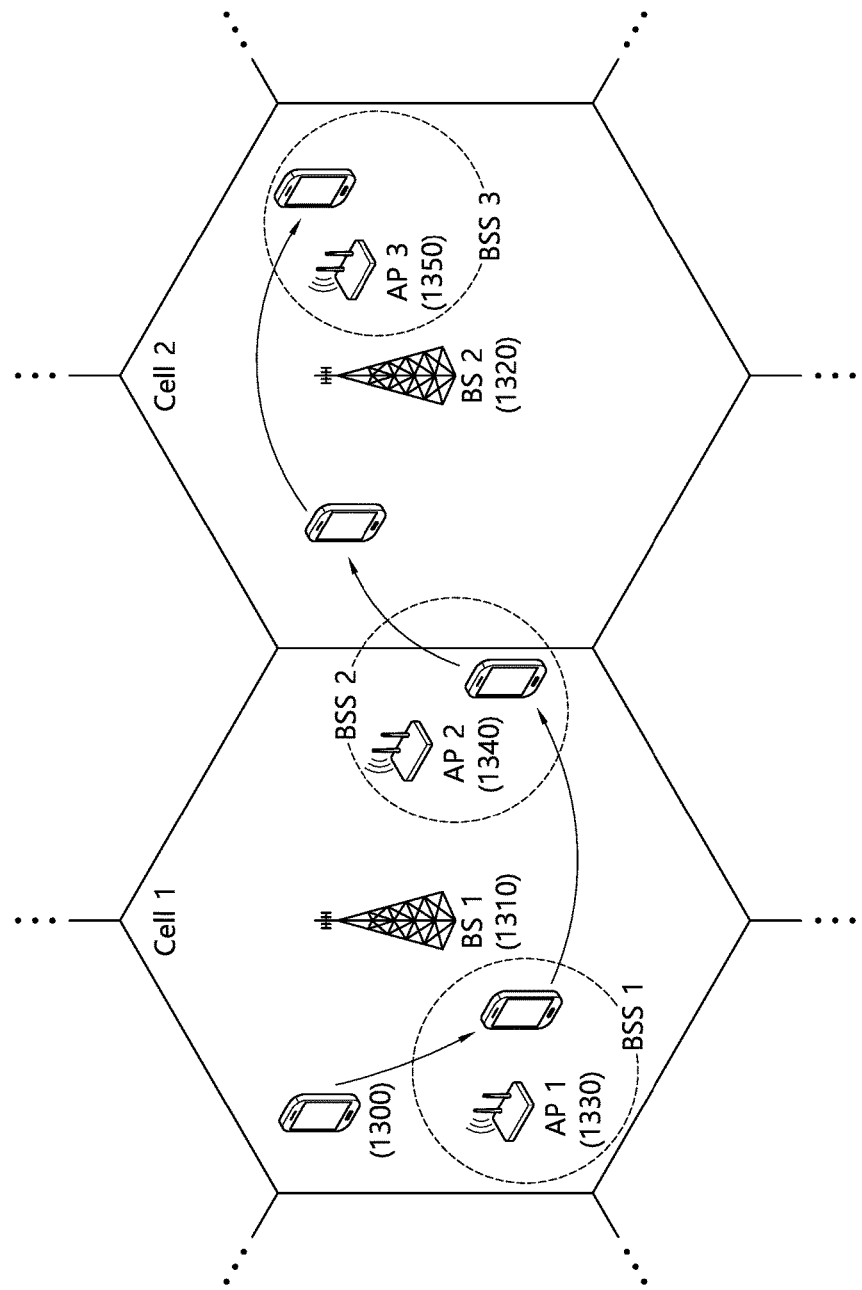
FIG. 9 is a diagram illustrating an environment in which a 3GPP access network and a WLAN access network coexist.

FIG. 9 is a diagram illustrating an environment in which a 3GPP access network and a WLAN access network coexist.

Referring to FIG. 9, as a 3GPP access network, a cell 1 having a BS 1, 1310 at the center and a cell 2 having a BS 2, 1320 at the center is deployed. Further, as a WLAN access network, a Basic Service Set (BSS) 1 having an Access Point (AP) 1, 1330 located within the cell 1 at the center and a BSS 2 having an AP2, 1340 at the center are deployed, and a BSS 3 having an AP3, 1350 existing within the cell 2 at the center is deployed. Coverage of the cell is designated by a solid line, and coverage of the BSS is designated by a dotted line.

It is assumed that a UE 1300 is set to perform communication through at least one of a 3GPP access network and a WLAN access network. In this case, the UE 1300 may be referred to as a station.

First, the UE 1300 may establish a connection with the BS 1, 1310 within the cell 1 to process traffic through the 3GPP access network.

It is assumed that the UE 1300 is entered into coverage of the BSS 1 while moving within coverage of the cell 1. In this case, when a traffic processing is not smooth between the UE 1300 and the BS 1, 1310 or when a traffic processing is smooth between the UE 1300 and the AP 1, 1330, it is efficient to move traffic from the 3GPP access network to the WLAN access network.

Hereinafter, a method of steering traffic will be described.

Traffic steering means steering of traffic or a path of traffic to variably process through a 3GPP access network and/or a non-GPP access network. Hereinafter, it is illustrated that the 3GPP access network is a UTRAN/E-UTRAN (LTE/LTE-A) and the non-3GPP access network is a WLAN access network. For convenience of description, the 3GPP access network may be referred to a first network, a RAN, or LTE, and a non-3GPP access network may be referred to a second network or a WLAN.

Figure 10:
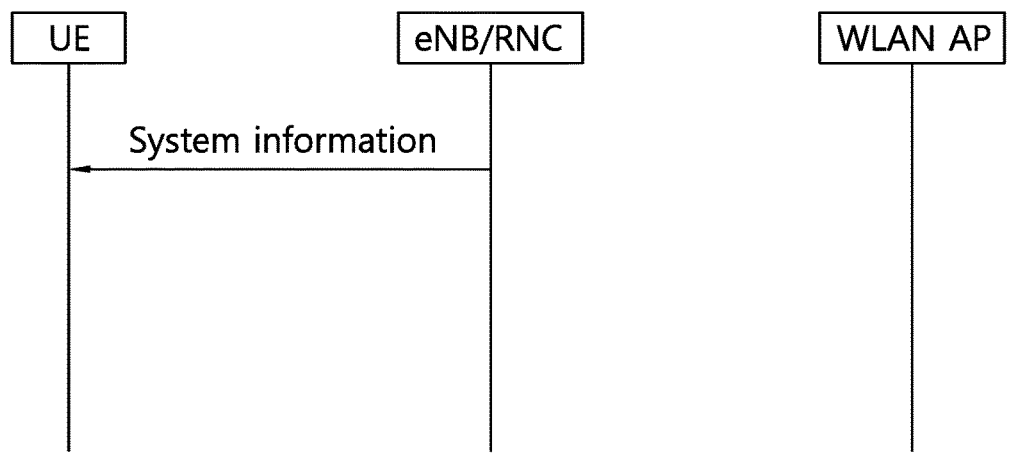
FIG. 10 is a diagram illustrating an example of a method of steering traffic.

FIG. 10 is a diagram illustrating an example of a method of steering traffic.

Referring to FIG. 10, an eNB/RNC may be an eNB of a first network RAN, and a WLAN AP may be an eNB of a second network. The eNB/RNC may provide RAN assistance information to the UE through system information. RAN assistance information may be referred to network assistance information. RAN assistance information may be broadcasted or may be provided through an exclusive signal.

RAN assistance information may include at least one of following parameters.

TABLE 2

| Parameter | Description |
| --- | --- |
| Load Information | Directly/indirectly instruct a UMTS/LTE load. (e.g., display a percent of a UMTS/LTE load or display an offload percent) |
| Resource Allocation | Allocate maximum resource in which the UE may receive from UMTS/LTE |
| WLAN Thresholds | Threshold of a WLAN received signal strength indicator (RSSI), a WLAN BSS load threshold, and a WLAN WAN metric threshold<br>Threshold of an available downlink and uplink backhaul band. |
| RAN Thresholds | RSRP/RSCP thresholds<br>RSRP measurement threshold for measuring 3GPP RAN<br>RSCP measurement threshold for measuring WLAN |

The UE may move a load, i.e., offload from the first network to the second network based on parameters included in RAN assistance information.

A rule representing whether to move a load under which condition may be referred to as a RAN rule. When the UE applies a RAN rule, the UE may use parameters provided by RAN assistance information.

For example, a RAN rule may be determined as follows. That is, when reference signal received power (RSRP) of the first network is smaller than a threshold s, when a load/traffic of the first network is larger than a threshold x, when a received signal strength indicator (RSSI) of the second network is larger than a threshold r, and when a load/traffic of the second network is smaller than a threshold y, the UE may move a load to the second network.

Alternatively, when RSRP of the first network is larger than a threshold s', when a load/traffic of the first network is smaller than a threshold x', when an RSSI of the second network is smaller than a threshold r', and when a load/traffic of the second network is larger than a threshold y', the UE may move a load to the first network. The thresholds s, s' x, and x' used in such a RAN rule may be RAN thresholds provided by RAN assistance information of Table 2, and r, r', y, and y' may be WRAN thresholds.

Alternatively, as another example of a RAN rule, when RSRP of the first network is smaller than a threshold s, when an RSSI of the second network is larger than a threshold r, and when a load/traffic of the second network is smaller than a threshold y, the UE may move a load to the second network. Alternatively, when RSRP of the first network is larger than a threshold s', when an RSSI of the second network is smaller than a threshold r', or when a load/traffic of the second network is larger than a threshold y', the UE may move a load to the first network.

More specifically, a traffic steering condition to a WLAN and a traffic steering condition to a 3GPP access network may be as follows.

(I) Traffic steering condition to WLAN access network

1) RSRP measured value (measured_RSRP)<low RSRP threshold (Threshold_RSRP_low), 3GPP load measured value (measured_3GPPLoad)>high 3GPP load threshold (Threshold_3GPPLoad_High): That is, it is a case of satisfying a condition in which a measured value of RSRP of LTE, which is the first network is lower than a threshold and in which a load measured value is higher than a threshold.

2) WLAN load measured value (measured_WLANLoad)<low WLAN load threshold (Threshold_WLANLoad_low), WLAN signal strength measured value (measured_WLANsignal)>high WLAN signal strength threshold (Threshold_WLANsignal_high): That is, it is a case of satisfying a condition in which signal strength of a WLAN, which is the second network is higher than a threshold and in which a load measured value is lower than a threshold.

When the UE moves traffic from the second network to the first network, a traffic steering condition may be as follows.

(II) Traffic steering condition to 3GPP access network
RSRP measured value (measured_RSRP)>high RSRP threshold (Threshold_RSRP_high)
3GPP load measured value (measured_3GPPLoad)<low 3GPP load threshold (Threshold_3GPPLoad_High)
WLAN load measured value (measured_WLANLoad)>high WLAN load threshold (Threshold_WLANLoad_high)
WLAN signal strength measured value (measured_WLANsignal)<low WLAN signal strength threshold (Threshold_WLANsignal_low)

In the foregoing traffic steering condition evaluation, the at least one conditions may be set with a condition of and/or. For example, a traffic steering evaluation condition set with at least one condition may be implemented as follows.

Traffic steering evaluation condition for steering traffic to a WLAN: (measured_RSRP<Threshold_RSRP_low) and
(measured_WLANLoad<Threshold_WLANLoad_low) and (measured_WLANsignal>Threshold_WLANsignal_high)

Traffic steering evaluation condition for steering traffic to 3GPP: (measured_RSRP>Threshold_RSRP_low) or (measured_WLANLoad>Threshold_WLANLoad_high) or
(measured_WLANsignal<Threshold_WLANsignal_low)

Figure 11:
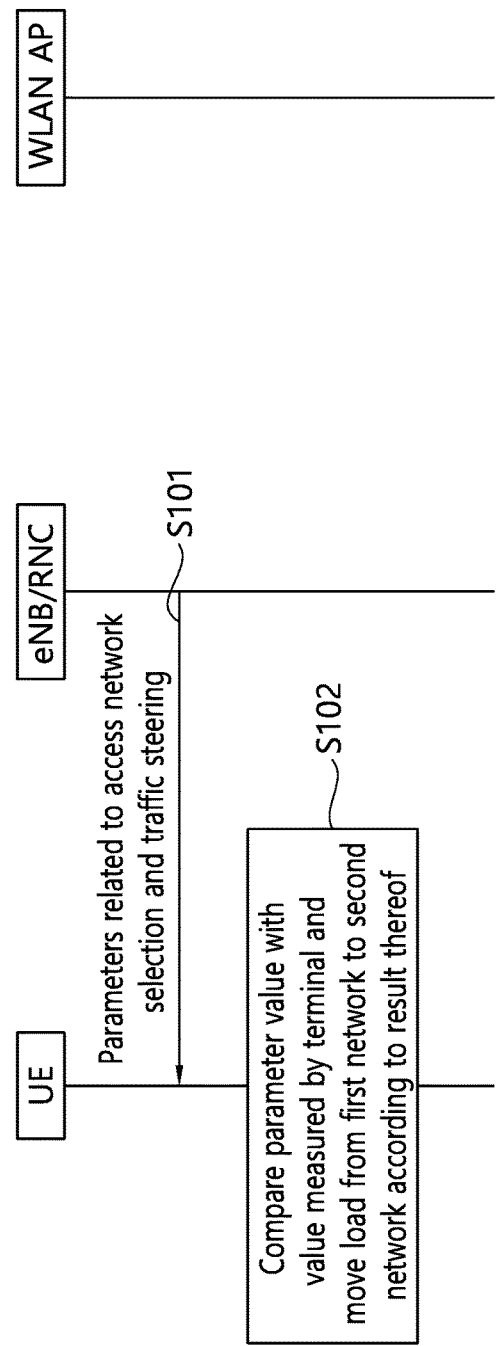
FIG. 11 is a flowchart illustrating another example of a method of steering traffic.

FIG. 11 is a flowchart illustrating another example of a method of steering traffic.

Referring to FIG. 11, an eNB/RNC is an eNB of a first network RAN, and a WLAN AP is an eNB of a second network. The eNB/RNC transmits a parameter for traffic steering evaluation according to a parameter related to access network selection and traffic steering, i.e., a RAN rule to the UE (S101). Here, the RAN rule means a rule of an interworking policy in which measurement parameters such as a load and a signal quality of a 3GPP access network and/or a WLAN access network are reflected. The parameter may be broadcasted or may be provided through an exclusive signal.

A RAN rule and a parameter of the RAN rule may be set as follows.

1) The RAN rule may instruct whether traffic steering to the WLAN is allowed.

2) The RAN rule may instruct a traffic steering evaluation condition, which is a condition in which it is allowed or required that the UE steers traffic from a 3GPP access network to a WLAN access network. A condition according to the RAN rule may accompany evaluation of measurement results of an LTE cell. Further, a condition according to the RAN rule may accompany evaluation of measurement results of a WLAN. Evaluation may be comparison with a RAN rule parameter (e.g., measurement threshold) instructed within the measurement result and traffic steering information.

3) The RAN rule may instruct may instruct a condition in which it is allowed or required that the UE steers traffic from the WLAN access network to the 3GPP access network.

4) The RAN rule may instruct a target WLAN access network in which it is allowed or required that the UE steers traffic from the 3GPP access network.

5) The RAN rule may instruct a traffic type in which routing to the WLAN access network is allowed. Alternatively, the RAN rule may instruct at least one traffic in which routing to the WLAN access network is allowed, i.e., that may be serviced only by the 3GPP access network.

The UE may compare the foregoing parameter value with values measured by the UE and move a load from the first network to the second network according to a result thereof (S102).

Hereinafter, an exemplary embodiment of the present invention will be described.

When power is initially turned on, the UE searches for an available public land mobile network (PLMN) and selects a suitable PLMN that may receive a service. The UE selects/registers a suitable PLMN and selects a cell having a signal quality and characteristic in which the UE may receive a suitable service among cells in which the selected PLMN provides. The cell may steer traffic between a first method of network (e.g., 3GPP LTE/LTE-A) and a second method of network (e.g., wireless LAN) according to traffic. The cell provides policies/parameters for steering traffic between a first method of network and a second method of network, and the policies/parameters may be referred to as RAN assistance information.

As described above, RAN assistance information may be provided through system information. Because system information is generally broadcasted, the system information may have a limitation in a size thereof, and a very large size of system information may be a burden to the system.

When the UE reselects a cell, a procedure that updates system information including RAN assistance information may be required. The procedure may be required even in a case in which the UE reselects a frequency or changes an RRC state. In such a case, system information including RAN assistance information should be able to again updated and thus system efficiency may be deteriorated.

Figure 12:
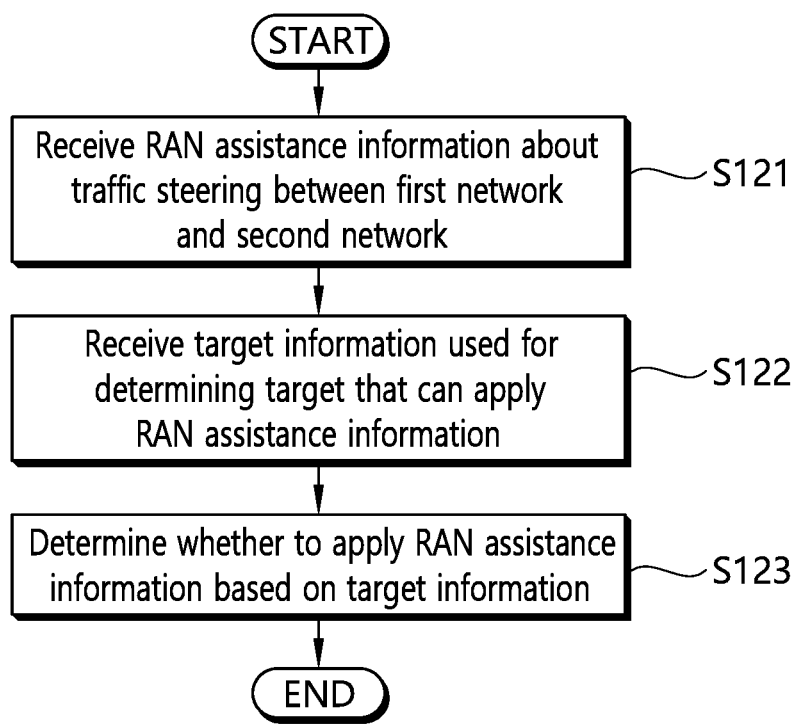
FIG. 12 is a flowchart illustrating a method of operating a UE according to an exemplary embodiment of the present invention.

FIG. 12 is a flowchart illustrating a method of operating a UE according to an exemplary embodiment of the present invention.

Referring to FIG. 12, the UE receives RAN assistance information about traffic steering between the first network and the second network (S121). The RAN assistance information may be included and broadcasted in system information or may be provided to an exclusive signal of a specific UE.

Table 3 illustrates system information including RAN assistance information.

TABLE 3

```
-- ASN1START
SystemInformationBlockType17-r12 ::=    SEQUENCE {
        wlan-OffloadInfoPerPLMN-List-r12        SEQUENCE (SIZE (1..maxPLMN-r11)) OF
                                                                                WLAN-
OffloadInfoPerPLMN-r12          OPTIONAL, -- Need OR
        lateNonCriticalExtension                                OCTET STRING
                OPTIONAL,
        ...
}
WLAN-OffloadInfoPerPLMN-r12 ::=                 SEQUENCE {
            wlan-OffloadConfigCommon-r12        WLAN-OffloadConfig-r12
        OPTIONAL,       -- Need OR
            wlan-Id-List-r12                                    WLAN-Id-List-r12
                OPTIONAL    -- Need OR
}
WLAN-Id-List-r12 ::=            SEQUENCE (SIZE (1..maxWLAN-Id-r12)) OF WLAN-Id-r12
WLAN-Id-r12 ::=
CHOICE {
        ssid-r12                                        OCTET    STRING    (SIZE
(1..32)),
        bssid-r12                                       OCTET STRING (SIZE (6)),
        hessid-r12                                      OCTET STRING (SIZE (6))
}
-- ASN1STOP
```

In Table 3, a 'wlan-OffloadInfoPerPLMN-List' may include the 'maxPLMN' number of 'WLAN-OffloadInfoPerPLMN'.

Each 'WLAN-OffloadInfoPerPLMN' includes a 'WLAN-OffloadConfig', and a 'WLAN-OffloadConfig' may include various thresholds/parameters related to traffic steering of Table 2. Here, 'WLAN-OffloadInfoPerPLMN' or 'WLAN-OffloadConfig' may be an example of RAN assistance information.

In Table 3, 'ssid' represents a service set ID defined in the WLAN. 'ssid' may be ID for at least one AP. A plurality of APs may use the same SSID. A mobile communication network operator may use the same SSID to entire APs. A size of the SSID may be maximum 32 octets.

'bssid' represents a basic service set identifier (ID) defined in the WLAN. 'bssid' may be a MAC address of an AP. Therefore, in a network, one AP has an intrinsic BSSID. A size of BSSID may be 6 octets.

'bessid' represents a homogenous extended service set identifier (ID) defined in the WLAN. 'hessid' may be an ID for a set of the AP in the network. HESSID is uniquely given to an AP set and may be equally selected to BSSID of any AP within the network. A size of HESSID may be 6 octets.

The UE receives target information used for determining a target that can apply RAN assistance information (S122). Target information may represent whether RAN assistance information received one time may be applied to which frequency, which cell, and which RRC state. A detailed application example will be described in detail hereinafter.

The UE determines whether to apply RAN assistance information based on target information (S123).

Hereinafter, exemplary embodiments of specifically applying the method of FIG. 12 will be described.

Figure 13:
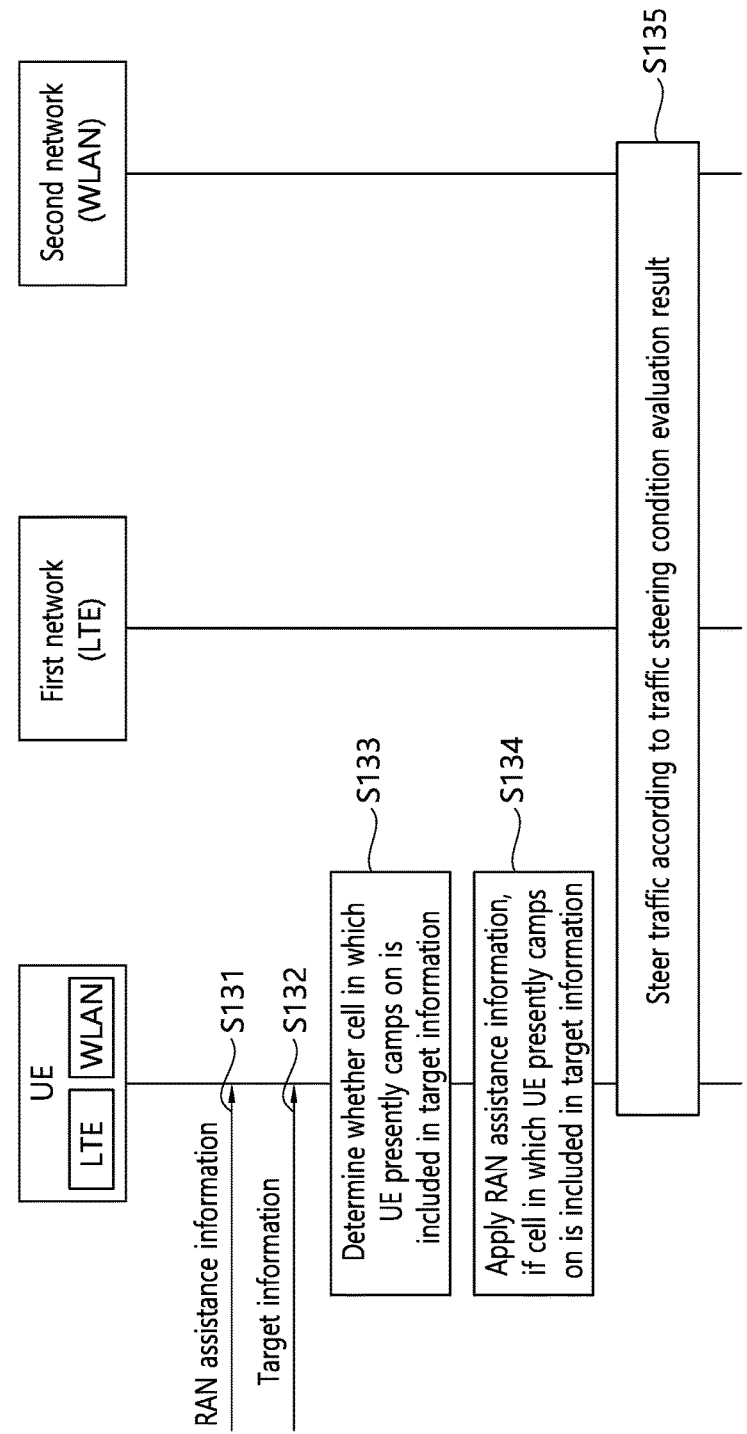
FIG. 13 is a flowchart illustrating a first example of applying the method of FIG. 12.

FIG. 13 is a flowchart illustrating a first example of applying the method of FIG. 12.

Referring to FIG. 13, the UE receives RAN assistance information (S131). For example, the UE may receive RAN assistance information from a cell #1.

Further, the UE receives target information (S132). The UE may receive target information through an UE exclusive signal or a broadcast signal. Target information received through an UE exclusive signal may be used for determining an application range of RAN assistance information received through the UE exclusive signal, and target information received through a broadcast signal may be used for determining an application range of RAN assistance information received through the broadcast signal.

Alternatively, target information received through an UE exclusive signal may be used for determining an application range of RAN assistance information received through broadcast signaling. In contrast, target information received through a broadcast signal may be used for determining an application range of RAN assistance information received through an UE exclusive signal.

The UE may receive target information from the cell #1. The target information may include a list of cells to which the RAN assistance information may be applied. For example, it is assumed that cells #1, 2, and 3 are listed in the list.

It is assumed that the UE presently camps on the cell #2 through cell reselection.

The UE determines whether a cell in which the UE presently camps on is included in target information (S133). If a cell in which the UE presently camps on is included in target information, the UE applies RAN assistance information (S134).

The UE presently camps on the cell #2 and the cell #2 is included in the target information and thus the UE may equally use the RAN assistance information. That is, a cell in which the UE presently camps on may apply RAN assistance information when the UE performs interworking, i.e., traffic steering of the first network and the second network.

The UE evaluates a traffic steering condition using RAN assistance information and steers traffic between the first network LTE and the second network WLAN according to a result thereof (S135).

For example, RAN assistance information may include a list of WLAN IDs. The UE may apply a list of the WLAN IDs to interworking between UTRAN-WLANs. That is, a WLAN having an SSID included in the WLAN ID list is found, and when the found WLAN satisfies an offloading condition, the UE offloads a portion or the entire of traffic from the UTRAN to the WLAN. That is, the UE steers traffic.

The example describes a case of including a list of WLAN IDs in RAN assistance information, but a list of WLAN IDs may be signaled separately from RAN assistance information.

In FIG. 13, target information includes a list of cells, but the target information is not limited thereto. That is, target information may include a list of frequencies. This will be described.

The UE receives RAN assistance information from a cell thereof. The RAN assistance information may be broadcasted or may be transmitted through an exclusive signal. The UE may receive a list of frequencies with target information. One primary frequency may be set to the UE. A secondary frequency may be additionally set to the UE. In the primary frequency, a primary cell operates and performs initial access/RRC connection of the UE. In the secondary frequency, a secondary cell operates.

When the UE camps on at any one of frequencies included in the list, it may be regarded that RAN assistance information may be applied. That is, it may be regarded that RAN assistance information may be applied to traffic steering between the UTRAN and the WLAN.

In this case, two application methods may exist.

First, only when a primary frequency of the UE is included in a list of the frequencies, the UE may apply the RAN assistance information. That is, the UE may determine a RAN rule using the RAN assistance information, and when the RAN rule is satisfied, the UE may steer traffic of data transmitted with a primary frequency to the WLAN.

Second, when a serving frequency (i.e., primary frequency or secondary frequency) of the UE is included in a list of the frequencies, the UE may apply the RAN assistance information. In this case, for a corresponding frequency, the UE may determine a RAN rule using the RNA assistance information and steer traffic of data transmitted with a corresponding frequency to a WLAN, when the RAN rule is satisfied.

Target information may include a list including a frequency and cells of the frequency. In any one frequency of frequencies included in the list, when the UE camps on any one cell of cells listed at the frequency, it may be regarded that RAN assistance information may be applied.

A maximum time segment in which RAN assistance information may be applied to another cell/frequency may be defined. Such a maximum time segment may be set or may be previously determined by a network. When the UE receives RAN assistance information, if a timer is started and terminated, the UE stops to apply the RAN assistance information to a corresponding cell/frequency.

When the UE does not receive target information, it is regarded that the UE may apply RAN assistance information to cells of a frequency received the RAN assistance information.

Alternatively, when the UE does not receive a list, i.e., target information of a cell/frequency in which RAN assistance information is to be applied, the UE may apply RAN assistance information received for a predetermined time regardless of a camp-on cell/frequency.

When the UE newly receives second RAN assistance information that can apply to a specific cell/frequency while applying first RAN assistance information at the specific cell/frequency, the UE applies the second RAN assistance information to the specific cell/frequency from that time.

Figure 14:
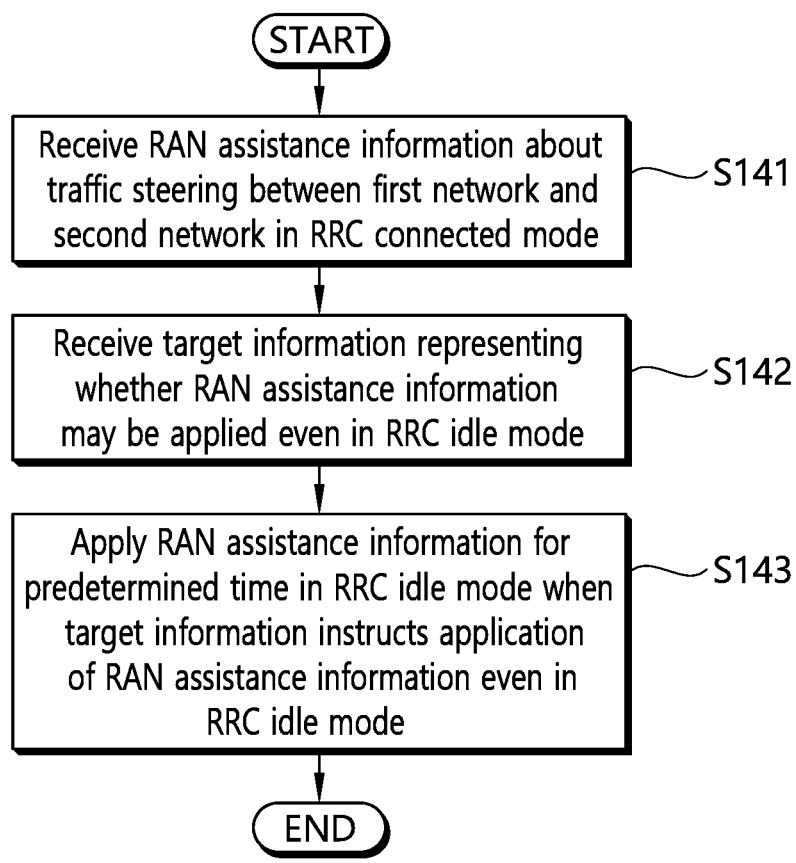
FIG. 14 is a flowchart illustrating a second example of applying the method of FIG. 12.

FIG. 14 is a flowchart illustrating a second example of applying the method of FIG. 12.

Referring to FIG. 14, the UE receives RAN assistance information about traffic steering between a first network and a second network in an RRC connected mode (S141).

The UE receives target information representing whether the RAN assistance information may be applied even in an RRC idle mode (S142). That is, while the network provides RAN assistance information to the UE in a RRC connected mode, the network may set whether the RAN assistance information should be applied even in an RRC idle mode. Such setting may be explicitly signaled. For example, when RAN assistance information is transmitted, the RAN assistance information includes 1 bit flag and may notify whether it is applied even in an RRC idle mode. Alternatively, such setting may be previously set or determined. That is, the UE previously sets or determines to use/or no to use RAN assistance information received in an RRC connected mode in an RRC idle mode without separate signaling. When the UE performs handover from a source cell to a target cell, the setting may be transferred from the source cell to the target cell.

When the target information instructs application of the RAN assistance information even in an RRC idle mode, the UE may apply the RAN assistance information for a predetermined time in the RRC idle mode (S143).

When RAN assistance information received in an RRC connected mode is set to apply even in an RRC idle mode, even if the UE deviates from the RRC connected mode, the UE may continuously apply the RAN assistance information received in the RRC connected mode. In the RRC idle mode, even if RAN assistance information is broadcasted, the UE may continuously apply the RAN assistance information received in the RRC connected mode.

Further, a maximum time that can apply the RAN assistance information received in the RRC connected mode may be set. For example, when the UE receives RAN assistance information in the RRC connected mode, the UE may start a timer while deviating from the RRC connected mode. Until the timer is terminated, the UE applies the RAN assistance information received in the RRC connected mode, and when the timer is terminated, the UE discards the RAN assistance information. When broadcasted RAN assistance information is newly received, after the timer is terminated, the UE applies the new RAN assistance information to UTRAN-WLAN interworking.

Although not shown in FIG. 14, when RAN assistance information received in the RRC connected mode is not set to apply even to the RRC idle mode, if the UE deviates from the RRC connected mode, the UE discards the RAN assistance information received in the RRC connected mode. When broadcasted RAN assistance information is newly received, the UE applies the new RAN assistance information to UTRAN-WLAN interworking from a time deviated from the RRC connected mode.

When the UE is in an RRC connected mode, the network may release RAN assistance information that has been stored at the UE.

In interworking between the UTRAN and the WLAN, although WLAN IDs are already provided to the UE through RAN assistance information, the WLAN IDs may be again provided to the UE through ANDSF setting and vice versa. In this way, when WLAN IDs are overlappingly provided to the UE, it is necessary to determine a priority of the WLAN.

Figure 15:
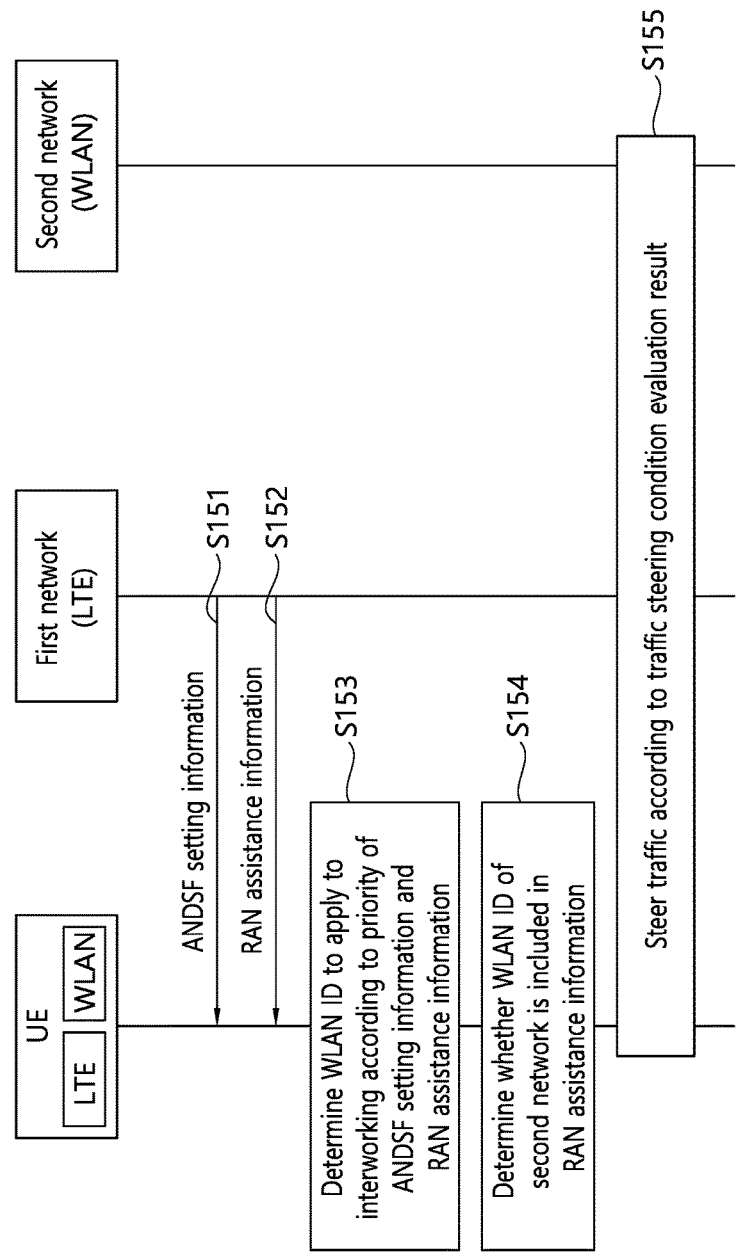
FIG. 15 is a flowchart illustrating a method of operating a UE according to another exemplary embodiment of the present invention.

FIG. 15 is a flowchart illustrating a method of operating a UE according to another exemplary embodiment of the present invention.

Referring to FIG. 15, a first network of a cell provides ANDSF setting information including WLAN IDs to a UE (S151).

The first network provides RAN assistance information including WLAN IDs to the UE (S152).

In this way, when WLAN IDs are provided through different information, it may be a problem that which WLAN ID should be used for interworking between UTRAN-WLAN.

The UE determines a WLAN ID to apply to interworking according to a priority of ANDSF setting information and RAN assistance information (S153). For example, the UE may regard that a WLAN ID received as a portion of RAN assistance information has a priority higher than that of a WLAN ID received through ANDSF setting information.

The UE determines whether a WLAN ID of the second network is included in RAN assistance information (S154).

In the example, it is assumed that WLAN ID #1 (representing WLAN #1) is included in RAN assistance information and that WLAN ID #2 (representing WLAN #2) is included in ANDSF setting information. It is assumed that both WLANs in which the WLAN IDs #1 and 2 represent satisfy an offloading condition from the UTRAN to the WLAN. In this case, the UE may offload traffic to the WLAN #1. This is because the WLAN ID #1 has a higher priority.

When a plurality of WLAN IDs are included in RAN assistance information and when a priority exists between the plurality of WLAN IDs, the UE selects a WLAN having a highest priority. However, when a priority does not exist in the plurality of WLAN IDs, the UE may regard that the entire of the plurality of WLAN IDs have the same priority and may select one WLAN according to an internal reference thereof.

If a WLAN ID of the second network is included in RAN assistance information, the UE evaluates a traffic steering condition using the RAN assistance information and steers traffic according to a result thereof (S155).

In the foregoing description of the present invention, RAN assistance information has been generally described. However, the present invention is not limited thereto and may be applied to a plurality of cells/frequencies/RRC states and may be similarly applied even to broadcasted other information.

Figure 16:
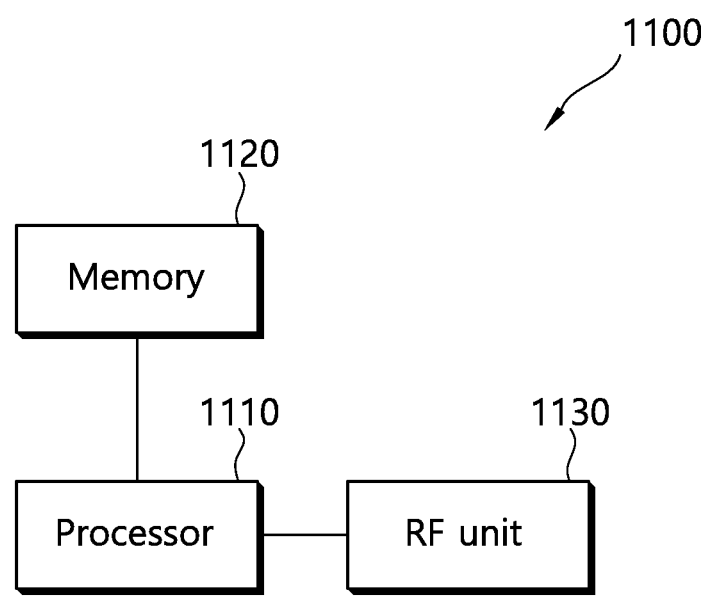
FIG. 16 is a block diagram illustrating a wireless device in which an exemplary embodiment of the present invention may be implemented.

FIG. 16 is a block diagram illustrating a wireless device in which an exemplary embodiment of the present invention may be implemented.

Referring to FIG. 16, a wireless device 1100 includes a processor 1110, a memory 1120, and a radio frequency (RF) unit 1130.

The processor 1110 implements a suggested function, process and/or method. The processor 1110 receives RAN assistance information about traffic steering between a first network and a second network and receives target information used for determining a target that can apply the RAN assistance information. The processor 1110 may determine whether to apply RAN assistance information based on target information.

The RF unit 1130 is connected to the processor 1110 to transmit and receive a wireless signal. The RF unit 1130 may include at least one RF unit for communication of a 3GPP-based access network and a non-3GPP-based access network.

The processor 1110 may include an application-specific integrated circuit (ASIC), other chipset, a logical circuit and/or a data processing device. FIG. 20 illustrates that the single processor 1110 controls and manages an entire RF unit for each access network communication, but a wireless device according to an exemplary embodiment of the present invention is not limited thereto. Each RF unit for each access network communication may be functionally coupled to each processor.

The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

What is claimed is:

1. A method of operating a User Equipment (UE) in a wireless communication system, the method comprising:
    receiving, by the UE, Radio Access Network RAN assistance information about traffic steering between a first network and a second network;
    receiving, by the UE, target information used for determining a target that can apply the RAN assistance information; and
    determining, by the UE, whether to apply the RAN assistance information based on the target information,
    wherein the target information comprises a list of frequencies or cells in which the RAN assistance information may be applied, wherein when a cell in which the UE camps on is identified by the list of frequencies or cells, traffic is steered by applying the RAN assistance information to the cell.

2. The method of claim 1, wherein the RAN assistance information is broadcasted.

3. The method of claim 1, wherein traffic is steered by applying the RAN assistance information to the cell, when a frequency of a cell in which the UE camps on is included in the list.

4. The method of claim 3, wherein a frequency of a cell in which the UE camps on is a primary frequency of the UE.

5. The method of claim 1, wherein the RAN assistance information is received, when the UE is in a radio resource control (RRC) connected mode.

6. The method of claim 5, wherein the target information represents whether the RAN assistance information received in the RRC connected mode may be applied even in an RRC idle mode.

7. The method of claim 6, wherein the RAN assistance information received in the RRC connected mode is applied even to the RRC idle mode only at a specific time segment.

8. The method of claim 1, wherein the RAN assistance information is included and received in system information.

9. A User Equipment (UE) operating in a wireless communication system, the UE comprising:
    a Radio Frequency (RF) unit that transmits and receives a wireless signal; and
    a processor that couples and operates to the RF unit,
    wherein the processor receives Radio Access Network RAN assistance information about traffic steering between a first network and a second network, receives target information used for determining a target that can apply the RAN assistance information, and determines whether to apply the RAN assistance information based on the target information, wherein the target information comprises a list of frequencies or cells in which the RAN assistance information may be applied, wherein when a cell in which the UE camps on is identified by the list of frequencies or cells, traffic is steered by applying the RAN assistance information to the cell.

* * * * *